(12) United States Patent
Huang et al.

(10) Patent No.: US 11,144,491 B1
(45) Date of Patent: Oct. 12, 2021

(54) INTEGRATED CIRCUIT AND INTERFACE CONTROL CIRCUIT THEREOF

(71) Applicant: Winbond Electronics Corp., Taichung (TW)

(72) Inventors: Julie Huang, San Jose, CA (US); Chi-Shun Lin, San Jose, CA (US)

(73) Assignee: Winbond Electronics Corp., Taichung (TW)

(*) Notice: Subject to any disclaimer, the term of this patent is extended or adjusted under 35 U.S.C. 154(b) by 0 days.

(21) Appl. No.: 17/015,057

(22) Filed: Sep. 8, 2020

(51) Int. Cl.
*G06F 13/42* (2006.01)
*G06F 13/40* (2006.01)

(52) U.S. Cl.
CPC ...... *G06F 13/4004* (2013.01); *G06F 13/4282* (2013.01); *G06F 2213/0014* (2013.01)

(58) Field of Classification Search
CPC .................................................. G06F 13/404
See application file for complete search history.

(56) References Cited

U.S. PATENT DOCUMENTS

2002/0184419 A1* 12/2002 Creedon ................. G06F 30/30
710/100
2011/0307847 A1* 12/2011 Liao ....................... G06F 30/331
716/103

* cited by examiner

*Primary Examiner* — Henry Tsai
*Assistant Examiner* — Dean Phan
(74) *Attorney, Agent, or Firm* — JCIPRNET

(57) ABSTRACT

An interface control circuit includes an interface wrapper, a logic circuit, a multiplexer and a command decoder. The interface wrapper transceives a plurality of first signals in a first interface, converts the first signals to a plurality of second signals in a second interface, and generates at least one first command signal according to the first signals. The logic circuit receives the second signals, and generates a second command signal according to the second signals. The multiplexer receives the first command signal and the second command signal, and generates a third command signal according to the first command signal and the second command signal. The command decoder receives the third command signal and generates the decoded command according to the third command signal.

15 Claims, 4 Drawing Sheets

INTEGRATED CIRCUIT AND INTERFACE CONTROL CIRCUIT THEREOF

BACKGROUND OF THE INVENTION

1. Field of the Invention

The invention relates to an integrated circuit and an interface control circuit thereof, and more particularly, to the interface control circuit for converting signal between inter-integrated circuit ($I^2C$) interface and serial peripheral interface (SPI).

2. Description of Related Art

In a conventional art, an integrated circuit with Electrically-Erasable Programmable Read-Only Memory (EEPROM) can be accessed through inter-integrated circuit ($I^2C$) interface and/or serial peripheral interface (SPI). In application, $I^2C$ interface has a lower operation speed than SPI, but $I^2C$ interface has simpler hardware structure than the SPI. That is, each of $I^2C$ interface and SPI has its advantage for using. Also, for saving cost of product mask, to provide a $I^2C$ interface and SPI combo design in a single chip may be a good solution.

SUMMARY OF THE INVENTION

The invention provides an integrated circuit and an interface control circuit which can handle singles with multiple formats.

The interface control circuit includes an interface wrapper, a logic circuit, a multiplexer and a command decoder. The interface wrapper transceives a plurality of first signals in a first interface, converts the first signals to a plurality of second signals in a second interface, and generates at least one first command signal according to the first signals. The logic circuit receives the second signals, and generates a second command signal according to the second signals. The multiplexer receives the first command signal and the second command signal, and generates a third command signal according to the first command signal and the second command signal. The command decoder receives the third command signal and generates the decoded command according to the third command signal.

The integrated circuit includes a non-volatile memory and the interface control circuit mentioned above. The interface control circuit converts the first signals to generate a plurality of accessing control signals for accessing the non-volatile memory.

Based on the above, in the embodiments of the invention, the interface control circuit provide a combo interface solution, and a chip can receive signals with multiple formats through the interface control circuit.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
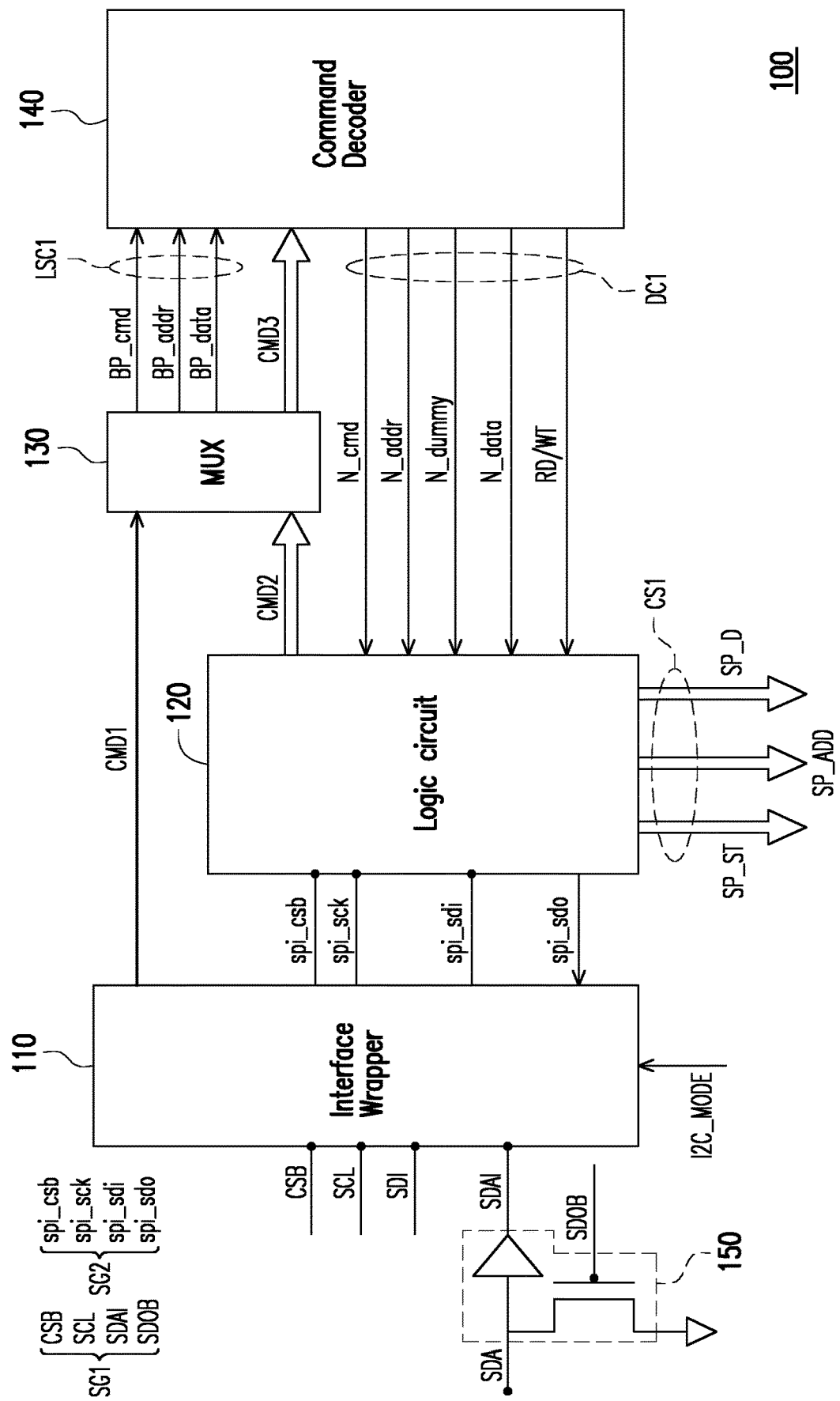
FIG. 1 illustrates a block diagram of an interface control circuit according to an embodiment of present disclosure.

Reference will now be made in detail to the present preferred embodiments of the disclosure, examples of which are illustrated in the accompanying drawings. Wherever possible, the same reference numbers are used in the drawings and the description to refer to the same or like parts.

Please refer to FIG. 1, which illustrates a block diagram of an interface control circuit according to an embodiment of present disclosure. The interface control circuit 100 includes an interface wrapper 110, a logic circuit 120, a multiplexer (MUX) 130, and a command decoder 140. The interface wrapper 110 transceives a plurality of first signals SG1 in a first interface. The interface wrapper 110 further performs converting operation between the first signals SG1 and a plurality of second signals SG2 in a second interface, and generates at least one first command signal CMD1 according to the first signals SG1. In present embodiment, the first interface may be inter-integrated circuit ($I^2C$) interface, and the second interface may be serial peripheral interface (SPI). Moreover, the first signals SG1 includes a chip select signal CSB, a clock signal SCL, a data input signal SDAI, and a data output signal SDOB, wherein all of the chip select signal CSB, the clock signal SCL, the data input signal SDAI, and the data output signal SDOB are $I^2C$ format signals. In here, a bi-direction signal SDA in SPI format can be coupled to an input output (I/O) buffer 150. The data input signal SDAI can be generated according to the bi-direction signal SDA, or the bi-direction signal SDA can be obtained according to the data output signal SDOB.

The interface wrapper 110 further receives a mode selection signal I2C_MODE. If the mode selection signal I2C_MODE is an active logic level, the interface wrapper 110 performs a converting operation for converting the first signals SG1 to generate the second signals SG2 in SPI format. The active logic level may be logic high level or logic low level. In this embodiment, the second signals SG2 includes a chip select signal spi_csb, a clock signal spi_sck, a data input signal spi_sdi, and a data output signal spi_sdo. All of the chip select signal spi_csb, the clock signal spi_sck, the data input signal spi_sdi, and the data output signal spi_sdo are all in SPI format.

On the other hand, if the mode selection signal I2C_MODE is a non-active logic level, the first signals SG1 received by the interface wrapper 110 may be in SPI format, and the interface wrapper 110 can directly output the first signals SG1 to be the second signals SG2.

When the converting operation is operated, the interface wrapper 110 may detect a slave address through the clock signal SCL and the data input signal SDAI. The interface wrapper 110 detects a $I^2C$ start condition and a $I^2C$ stop condition according to the chip select signal CSB of the first signals SG1 to convert the chip select signal spi_csb of the second signals SG2 to transit between two different logic level. If the $I^2C$ start condition is detected, the interface wrapper 110 makes the chip select signal spi_csb transited from logic high level to logic low level. If the I²C stop condition is detected, the interface wrapper 110 makes the chip select signal spi_csb transited from logic low level to logic high level.

The interface wrapper 110 converts the clock signal SCL in I²C format to the clock signal spi_sck in SPI format during the converting operation, and also converts the data input signal SDAI in I²C format to the data input signal spi_sdi in SPI format during the converting operation, too. In one embodiment, the interface wrapper 110 can directly output the clock signal SCL and the data input signal SDAI to respectively generate the clock signal spi_sck and the data input signal spi_sdi.

In a data load cycle during the converting operation, the interface wrapper 110 converts the data output signal spi_sdo in SPI format to the data output signal SDOB in I²C format.

The interface wrapper 110 also identifies an I²C receiving acknowledge cycle and an I²C sending acknowledge cycle according to the bi-direction signal SDA. The interface wrapper 110 converts the I²C receiving acknowledge cycle to a SPI data read cycle, and converts the I²C sending acknowledge cycle to a SPI data load cycle.

The interface wrapper 110 may also detect I²C test mode an I²C test mode sequence through the clock signal SCL and the data input signal SDAI, and enables a SPI test mode when the I²C test mode sequence is detected. The interface wrapper 110 may generates a first command signal CMD1 to include a detected I²C test mode sequence, and the first command signal CMD1 may also include an I²C device select code with read mode, an I²C device select code with write mode, an I²C acknowledge and an I²C mode selection signal.

The logic circuit 120 is coupled to the interface wrapper 110, the command decoder 130 and the MUX 130, receives the chip select signal spi_csb, the clock signal spi_sck, and the data input signal spi_sdi, and outputs the data output signal spi_sdo. Also, the logic circuit 120 receives decoded commands DC1 from the command decoder 140. The logic circuit 120 may generates a second command signal CMD2 according to the second signals SG2 and the decoded commands DC1. Wherein, the decoded commands DC1 may include a number of commands N_cmd, a number of address N_addr, a number of dummy N_dummy, a number of data N_data, and a read or write mode signal RD/WT.

The logic circuit 120 further generates accessing control signals CS1 according to the decoded command DC1. The accessing control signals CS1 include a state signal SP_ST, an address signal SP_ADD, and a data signal SP_D, wherein the state signal SP_ST, the address signal SP_ADD, and the data signal SP_D are all in SPI format.

The accessing control signals CS1 may be provided to a device having SPI, and the accessing control signals CS1 can be used to communicate with the device. The device may be memory circuit, the disposed on a same chip with the interface control circuit 100.

The MUX 130 receives the first command signal CMD1 and the second command CMD2. The MUX 130 generates a third command signal CMD3 according to the first command signal CMD1 and the second command signal CMD2, and further generates a logic state control signal LSC1 according to the first command signal CMD1. In this embodiment, the logic state control signal LSC1 includes one of a bypass command signal BP_cmd, a bypass address signal BP_addr and a bypass data signal BP_data.

About detail operation of the MUX 130, based on first command signal CMD1, the MUX 130 may convert the I²C device select code with read mode into a SPI read command. The MUX 130 also may convert the I²C device select code with write mode into a SPI write command. On the other hand, the MUX 130 may create the bypass command signal BP_cmd, the bypass address signal BP_addr or the bypass data signal BP_data according to the first command signal CMD1. The bypass command signal BP_cmd, the bypass address signal BP_addr and the bypass data signal BP_data are used to skip one or more command cycles, one or more address cycle and one or more data cycle in SPI logic for I²C operation of the first signals SG1.

The command decoder 140 receives the logic state control signal LSC1 and the third command signal CMD3, and generates the decoded command DC1 according to the logic state control signal LSC1 and the third command signal CMD3.

In this embodiment, all of the interface wrapper 110, the logic circuit 120, the MUX 130 and the command decoder 140 can be constructed by logic circuit components. The logic circuit 120 may be a state machine with a counter.

Figure 2A:
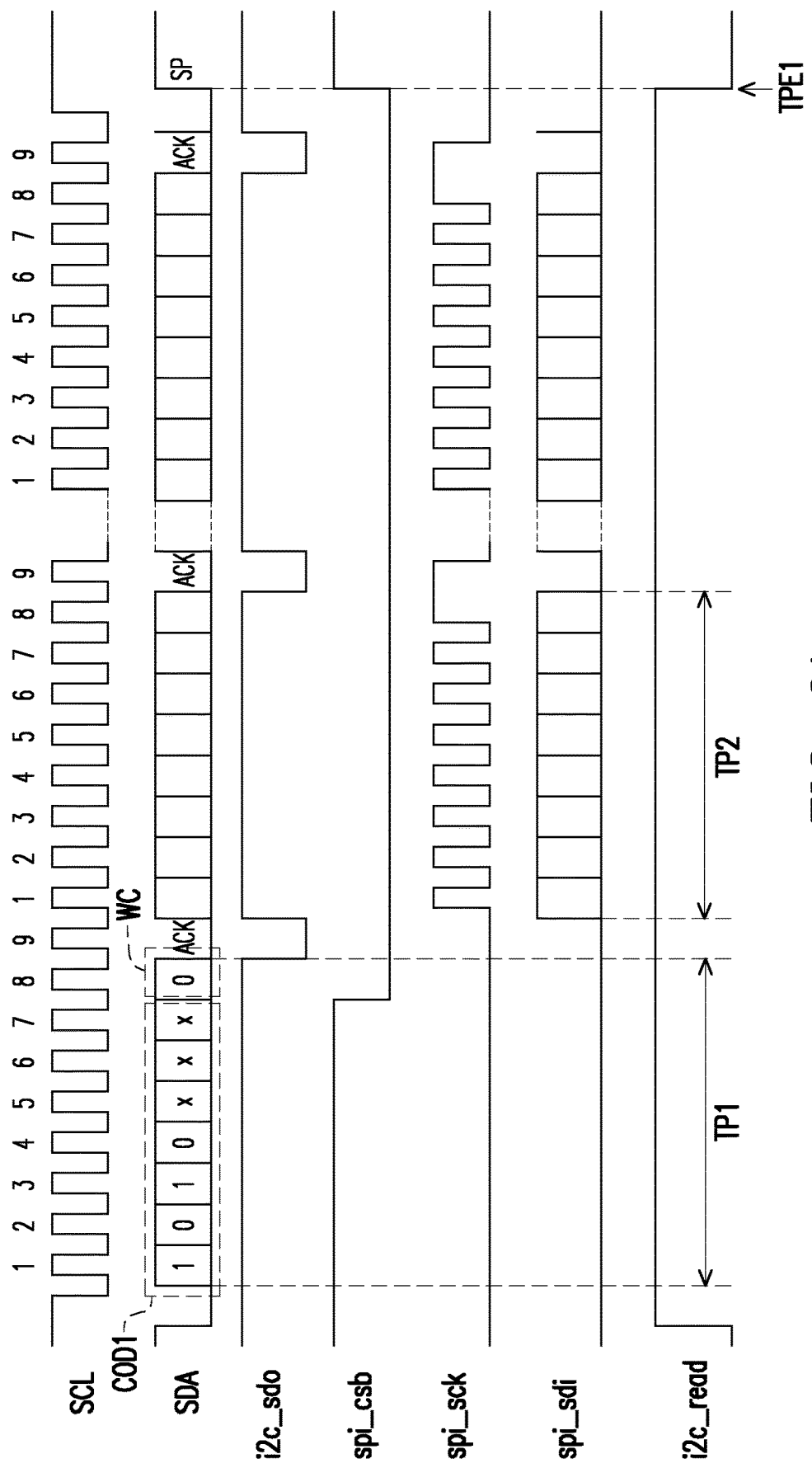
FIG. 2A illustrates a waveform plot of a writing operation of an interface control circuit according to an embodiment of present disclosure.

Refer to FIG. 2A, which illustrates a waveform plot of a writing operation of an interface control circuit according to an embodiment of present disclosure. Please refer FIG. 1 with FIG. 2A commonly, during a time period TP1, the bi-direction signal SDA is set to input signal and transmits a device select code COD1 and a write code WC, wherein the device select code COD1 may be logic values 1, 0, 1, 0, X, X, X and the write code WC is logic value 0. The interface wrapper 110 receives the device select code COD1 and the write code WC through the bi-direction signal SDA according to the clock signal SCL. After the device select code COD1 is received, the interface wrapper 110 can detect a I²C start condition, and converts the chip select signal spi_csb to transit from logic high level to logic low level. Then, a low pulse on a I²C data output code i2C_sdo can be generated in response to the write code WC in the I²C mode. Such as that, an acknowledge signal ACK with logic low level can be generate on the bi-direction signal SDA.

In here, the interface wrapper 110 can identify an I²C sending acknowledge cycle according to the acknowledge signal ACK, and converts the I²C sending acknowledge cycle to a SPI data load cycle.

In additional, after the write code WC with logic low level is received, the I²C device select code i2C_read can be pulled to logic low level. The I²C device select code i2C_read can be used to indicate an accessing operation of the I²C interface is set to a write mode or a read mode. In this embodiment, when the I²C interface is set to the write mode, the I²C device select code i2C_read is at logic low level, and when the I²C interface is set to the read mode, the I²C device select code i2C_read is at logic high level. The I²C device select code i2C_read can be included in the first command CMD1 as shown in FIG. 1. The I²C device select code i2C_read can be generated by the interface wrapper 110, and transmits to the MUX 130.

During a time period TP2, the interface wrapper 110 converts the clock signal SCL to the clock signal spi_sck. During the time period TP2, the bi-direction signal SDA is also set to input signal, and the interface wrapper 110 can receive a write-in data according to the clock signal SCL, and converts the bi-direction signal SDA to the data input signal spi_sdi. In this embodiment, during the time period TP2, waveforms of the clock signal SCL and the clock signal spi_sck may be the same, and waveforms of the bi-direction signal SDA and the data input signal spi_sdi may be the same.

The time period TP2 can be executed one or several times which depends on a number of the write-in data. In this embodiment, write-in data with 8 bits can be written during one time period TP2.

If the writing operation has been finished, a I²C stop condition SP can be generated after a time point TPE1. The interface wrapper can detect a I²C stop condition SP and convert the chip select signal spi_csb to transit from logic low level to logic high level.

It should be noted here, in this embodiment, the chip select signal spi_csb is a logic low enable signal. That is, if the chip select signal spi_csb is in logic low level, an operation of the logic circuit 120 can be activated, and if the chip select signal spi_csb is in logic high level, the operation of the logic circuit 120 can be stopped. Also, in other embodiment, the chip select signal spi_csb can also be defined to a high enable signal. Such as that, the operation of the logic circuit 120 can be activated when the chip select signal spi_csb in logic high level, and the operation of the logic circuit 120 can be stopped when the chip select signal spi_csb in logic low level.

Figure 2B:
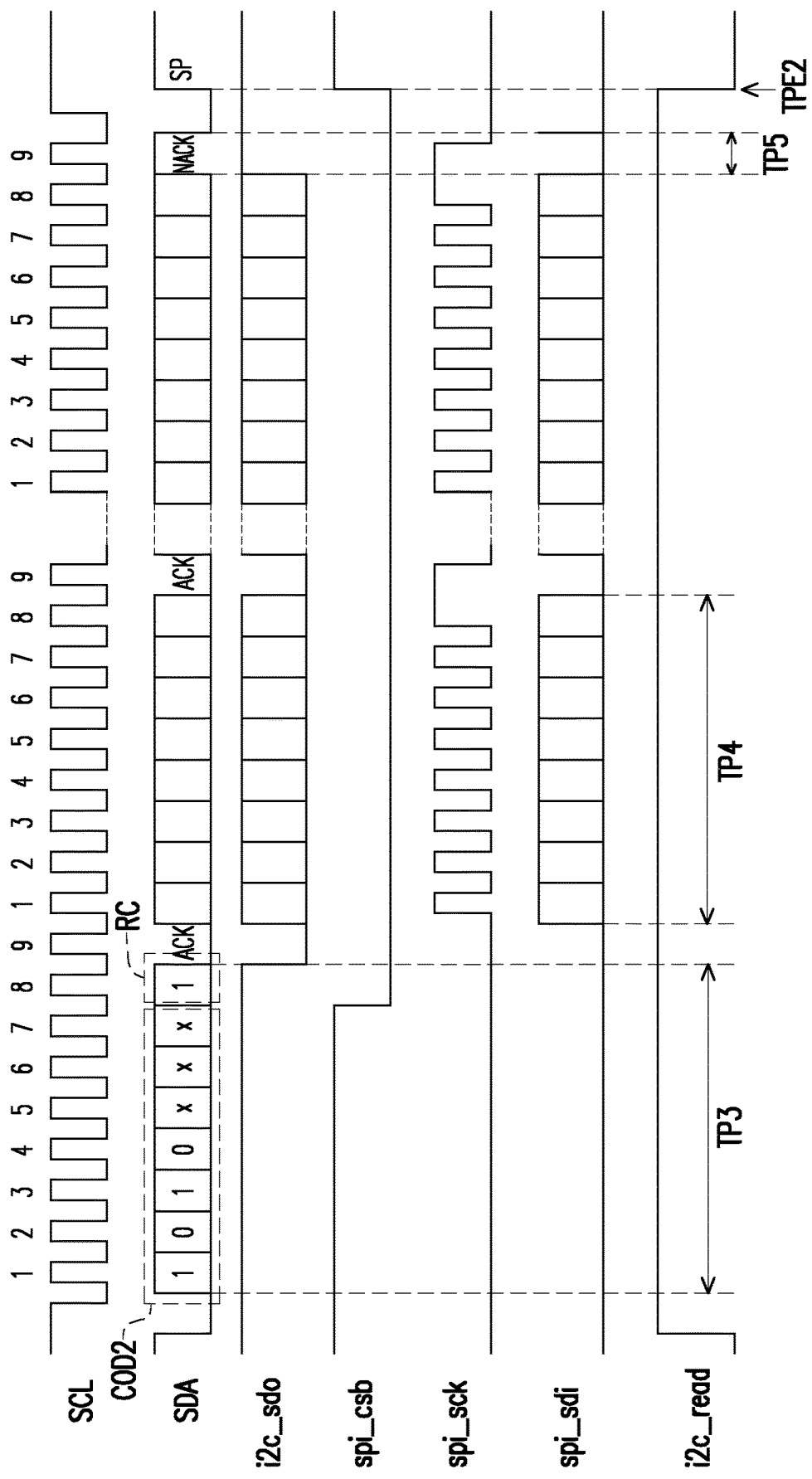
FIG. 2B illustrates a waveform plot of a reading operation of an interface control circuit according to an embodiment of present disclosure.

Refer to FIG. 2B, which illustrates a waveform plot of a reading operation of an interface control circuit according to an embodiment of present disclosure. Please refer FIG. 1 with FIG. 2B commonly, during a time period TP3, the bi-direction signal SDA is set to input signal and transmits a device select code COD2 and a read code RC, wherein the device select code COD2 may be logic values 1, 0, 1, 0, X, X, X and the read code RC is logic value 1. The interface wrapper 110 receives the device select code COD2 and the read code RC through the bi-direction signal SDA according to the clock signal SCL. After the device select code COD2 is received, the interface wrapper 110 can detect a I²C start condition, and converts the chip select signal spi_csb to transit from logic high level to logic low level. Then, the I²C data output code i2C_sdo can be pulled to logic low level in response to the write code WC. Such as that, an acknowledge signal ACK with logic low level can be generate on the bi-direction signal SDA. In here, since the read code RC is received, the I²C data output code i2C_sdo can be held in logic low level.

In here, the interface wrapper 110 can identify an I²C receiving acknowledge cycle according to the acknowledge signal ACK, and converts the I²C receiving acknowledge cycle to a SPI data read cycle.

In additional, after the read code RC with logic high level is received, the I²C device select code i2C_read can be held on logic high level to indicate an accessing operation of the I²C interface is set to a read mode.

During a time period TP4, the interface wrapper 110 converts the clock signal SCL to the clock signal spi_sck. During the time period TP4, the bi-direction signal SDA is also set to output signal, and the interface wrapper 110 can receive a read-out data from the data input signal spi_sdo according to the clock signal spi_sck, and converts the bi-direction signal SDA to the data output signal spi_sdo. In this embodiment, during the time period TP4, waveforms of the clock signal SCL and the clock signal spi_sck may be the same, and waveforms of the bi-direction signal SDA and the data output signal spi_sdo may be the same.

The time period TP4 can be executed one or several times which depends on a number of the read-out data. In this embodiment, read-out data with 8 bits can be read during one time period TP4.

During a time period TP5, a non-acknowledge signal NACK with logic high level is received from the bi-direction signal SDA. After a time point TPE2, a I²C stop condition SP can be detected. Accordingly, the interface wrapper converts the chip select signal spi_csb to transit from logic low level to logic high level to finish the reading operation.

Figure 3:
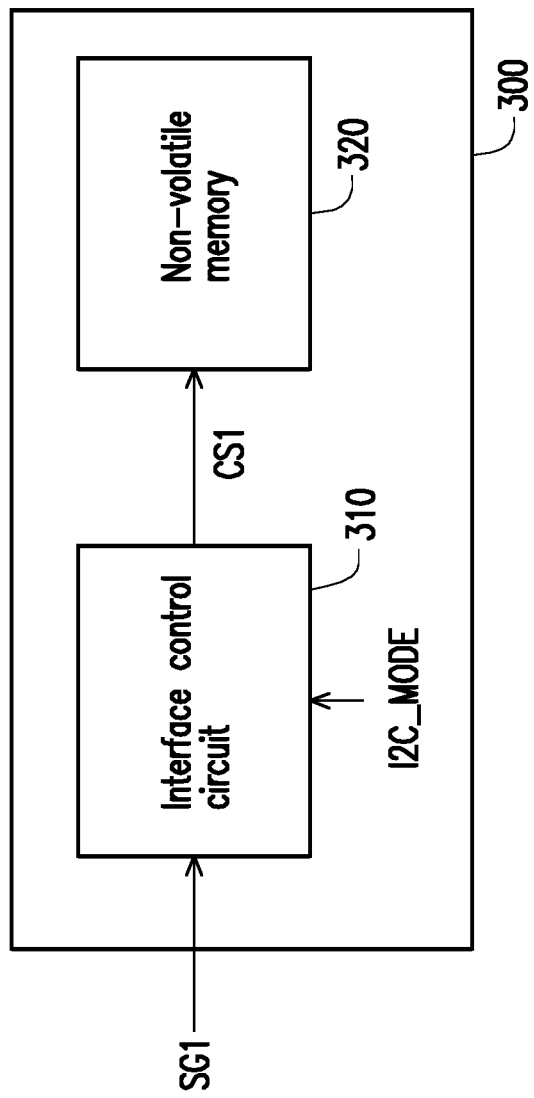
FIG. 3 illustrates a block diagram of an integrated circuit according to an embodiment of present disclosure.

Please refer to FIG. 3, which illustrates a block diagram of an integrated circuit according to an embodiment of present disclosure. The integrated circuit 300 includes an interface control circuit 310 and a non-volatile memory 320. The interface control circuit 310 is coupled to the non-volatile memory 320. The interface control circuit 310 may receive first signals SG1. The first signals SG1 may be in SPI format or in I²C format. In this embodiment, the integrated circuit 300 also has a mode selection bit. The mode selection bit may be used to set a mode selection signal I2C_MODE, and the mode selection signal I2C_MODE can be used to set operation mode of the interface control circuit 310. The mode selection bit may be provided by an electronic fuse or any other programmable non-volatile memory well known by a person skilled in the art. The mode selection bit also can be set through a I²C test mode to configure the integrated circuit 300 to an SPI mode, and a speed of testing operation can be enhanced.

When the interface control circuit 310 receives the first signals SG1 in I²C format, the interface control circuit 310 can converts the first signals SG1 to generate an accessing control signals CS1 for accessing the non-volatile memory 320. Detail operations have been described in the embodiments mentioned above, and no more repeated description here.

In additional, the non-volatile memory 320 may be Electrically-Erasable Programmable Read-Only Memory (EEPROM), flash memory or any other non-volatile memory known by a person skilled in the art.

In summary, the present disclosure provides an interface control circuit which can convert signals in I²C format to SPI format. Such as that, both of SPI and I²C format signals can be used in an integrated circuit, and the I²C interface and SPI combo chip design in a single chip may be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An interface control circuit, comprising:
   an interface wrapper transceiving a plurality of first signals in a first interface, converting the first signals to a plurality of second signals in a second interface, and generating at least one first command signal according to the first signals;
   a logic circuit, coupled to the interface wrapper, and receiving the second signals, generating a second command signal according to the second signals;
   a multiplexer, coupled to the interface wrapper and the logic circuit, receiving the first command signal and the second command signal, and generating a third command signal according to the first command signal and the second command signal; and
   a command decoder, coupled to the multiplexer and the logic circuit, receiving the third command signal and generating a decoded command according to the third command signal.

2. The interface control circuit according to claim 1, wherein the first interface is inter-integrated circuit (I²C) interface and the second interface is serial peripheral interface (SPI).

3. The interface control circuit according to claim 2, wherein the interface wrapper detects a I²C start condition and a I²C stop condition according to the first signals to convert a chip select signal of the second signals to transit between two different logic level.

4. The interface control circuit according to claim 2, wherein the interface wrapper, based on the first signals, converts an I²C receiving acknowledge cycle to a SPI data read cycle, and converts an I²C sending acknowledge cycle to a SPI data load cycle.

5. The interface control circuit according to claim 2, wherein the interface wrapper, based on the first signals, enables a SPI test mode by detecting an I²C test mode sequence.

6. The interface control circuit according to claim 1, wherein the multiplexer generates a logic state control signal according to the first command signal.

7. The interface control circuit according to claim 6, wherein the logic state control signal is one of a bypass command signal, a bypass address signal and a bypass data signal.

8. The interface control circuit according to claim 7, wherein the command decoder is configured to:
generate the decoded command according to the bypass command signal to skip a command cycle in a SPI logic operation;
generate the decoded command according to the bypass address signal to skip an address cycle in the SPI logic operation; or
generate the decoded command according to the bypass data signal to skip a data cycle in the SPI logic operation.

9. The interface control circuit according to claim 2, wherein the multiplexer, based on first command signal, converts an I²C device select code with read mode into a SPI read command.

10. The interface control circuit according to claim 2, wherein the multiplexer, based on first command signal, converts an I²C device select code with write mode into a SPI write command.

11. The interface control circuit according to claim 2, wherein the logic circuit is a finite state machine and further generates accessing control signals according to the decoded command.

12. An integrated circuit, comprising:
a non-volatile memory; and
the interface control circuit as claimed in claim 1,
wherein the interface control circuit is coupled to the non-volatile memory, and converts the first signals to generate a plurality of accessing control signals for accessing the non-volatile memory.

13. The integrated circuit according to claim 12, wherein the first interface is inter-integrated circuit (I²C) interface and the second interface is serial peripheral interface (SPI).

14. The integrated circuit according to claim 13, wherein the logic circuit is coupled to the non-volatile memory, and the logic circuit is a finite state machine and further generates accessing control signals for accessing the non-volatile memory according to the decoded command.

15. The integrated circuit according to claim 12, further comprising a mode selection bit, wherein the mode selection bit is set through a I2C test mode to configure the integrated circuit to an SPI mode.

* * * * *